United States Patent [19]

Osman

[11] Patent Number: 4,664,840

[45] Date of Patent: May 12, 1987

[54] LIQUID CRYSTAL COMPOUNDS

[75] Inventor: Maged A. Osman, Zurich, Switzerland

[73] Assignee: E. Merck, Darmstadt, Fed. Rep. of Germany

[21] Appl. No.: 673,334

[22] Filed: Nov. 20, 1984

Related U.S. Application Data

[63] Continuation-in-part of Ser. No. 382,229, May 26, 1982, abandoned, which is a continuation of Ser. No. 152,634, May 23, 1980, abandoned.

[30] Foreign Application Priority Data

May 28, 1979 [EP] European Pat. Off. ........ 79200259.4

[51] Int. Cl.$^4$ .................... C09K 19/30; C07C 121/52; C07C 121/54
[52] U.S. Cl. ..................... 252/299.63; 350/350 R; 558/414; 558/416; 558/421; 558/425; 252/299.65; 252/299.66; 252/299.67; 252/299.6
[58] Field of Search ............... 252/299.63, 299.64, 252/299.65, 299.67, 299.01, 299.6, 299.66; 260/465 D, 465 G, 465 F, 465 H; 558/414, 416; 350/350 R

[56] References Cited

U.S. PATENT DOCUMENTS

| | | | |
|---|---|---|---|
| 3,947,375 | 3/1976 | Gray et al. | 252/299.65 |
| 4,009,934 | 3/1977 | Goodwin et al. | 252/299.64 |
| 4,017,416 | 4/1977 | Inukai et al. | 252/299.63 |
| 4,027,950 | 6/1977 | Moriyama et al. | 252/299.5 |
| 4,029,594 | 6/1977 | Gaurilouic et al. | 252/299.67 |
| 4,073,742 | 2/1978 | Erdman et al. | 252/299.64 |
| 4,122,026 | 10/1978 | Osman | 252/299.5 |
| 4,130,502 | 12/1978 | Eidenschink et al. | 252/299.63 |
| 4,154,697 | 1/1978 | Eidenschink et al. | 252/299.63 |
| 4,198,312 | 4/1980 | Sato et al. | 252/299.63 |
| 4,216,109 | 8/1980 | Mizukuchi | 252/299.65 |
| 4,222,887 | 9/1980 | Matsufuji | 252/299.63 |
| 4,225,454 | 9/1980 | Yamagishi et al. | 252/299.65 |
| 4,229,315 | 10/1980 | Krause et al. | 252/299.63 |
| 4,237,026 | 12/1980 | Eidenschink et al. | 252/299.63 |
| 4,256,656 | 3/1981 | Beguin et al. | 252/299.62 |
| 4,279,770 | 7/1981 | Inukai et al. | 252/299.62 |
| 4,279,771 | 7/1981 | Shionozaki et al. | 252/299.63 |
| 4,287,085 | 9/1981 | Takei et al. | 252/299.63 |
| 4,368,135 | 1/1983 | Osman | 252/299.63 |
| 4,400,293 | 8/1983 | Romer | 252/299.5 |
| 4,405,488 | 9/1983 | Sugimori et al. | 252/299.63 |
| 4,406,814 | 9/1983 | Ferrato | 252/299.5 |
| 4,415,470 | 11/1983 | Eidenschink et al. | 252/299.63 |
| 4,424,371 | 1/1984 | Hsu | 252/299.63 |
| 4,536,321 | 8/1985 | Sugimori et al. | 252/299.5 |
| 4,551,280 | 11/1985 | Sasaki et al. | 252/299.65 |

FOREIGN PATENT DOCUMENTS

| | | | |
|---|---|---|---|
| 19665 | 12/1980 | European Pat. Off. | 252/299.63 |
| 51738 | 10/1981 | European Pat. Off. | 252/299.63 |
| 63003 | 10/1982 | European Pat. Off. | 252/299.63 |
| 74608 | 3/1983 | European Pat. Off. | 252/299.63 |
| 2933563 | 2/1981 | Fed. Rep. of Germany | 252/299.63 |
| 3139130 | 5/1982 | Fed. Rep. of Germany | 252/299.63 |
| 3241822 | 5/1983 | Fed. Rep. of Germany | 252/299.67 |
| 2484435 | 12/1981 | France | 252/299.67 |
| 105701 | 5/1974 | German Democratic Rep. | 252/299.63 |
| 49-55579 | 5/1974 | Japan | 252/299.67 |
| 49-55528 | 5/1974 | Japan | 252/299.67 |
| 51-33785 | 3/1976 | Japan | 252/299.5 |
| 53-76984 | 7/1978 | Japan | 252/299.5 |
| 53-75181 | 7/1978 | Japan | 252/299.67 |
| 55-29545 | 3/1980 | Japan | 252/299.64 |
| 55-81849 | 6/1980 | Japan | 252/299.65 |
| 55-84385 | 6/1980 | Japan | 252/299.67 |
| 56-16457 | 2/1981 | Japan | 558/414 |
| 56-43386 | 4/1981 | Japan | 252/299.63 |
| 57-05780 | 1/1982 | Japan | 252/299.63 |
| 57-154158 | 9/1982 | Japan | 252/299.63 |
| 58-18351 | 2/1983 | Japan | 558/416 |
| 58-210057 | 12/1983 | Japan | 558/414 |
| 60-161957 | 8/1985 | Japan | 558/414 |
| 81/00853 | 4/1981 | PCT Int'l Appl. | 252/299.65 |
| 1433130 | 4/1976 | United Kingdom | 252/299.66 |
| 2039937 | 8/1980 | United Kingdom | 252/299.66 |
| 2061311 | 5/1981 | United Kingdom | 252/299.63 |
| 2063287 | 6/1981 | United Kingdom | 252/299.63 |
| 2063250 | 6/1981 | United Kingdom | 252/299.63 |
| 2085910 | 5/1982 | United Kingdom | 252/299.63 |

OTHER PUBLICATIONS

Gray et al., J. Chem. Soc., Perkin Transactions, vol. 2, p. 97 (1976).
Gray et al., Mol. Cryst. Liq. Cryst., vol. 67, 1-24 (1981).
Karamysheva et al., J. de Phys., Coll. C3, Suppl. No. 4, vol. 40, pp. C3-37 to C3-40 (Apr. 1979).
Osman et al., MCLC, vol. 82, 1983, pp. 331-338.

*Primary Examiner*—Teddy S. Gron
*Assistant Examiner*—Thomas J. E.
*Attorney, Agent, or Firm*—Oblon, Fisher, Spivak, McClelland & Maier

[57] ABSTRACT

Anisotropic compounds of the following formula:

Y—(A)—Z—(benzene with $X^2$, $X^3$)—CN   (I)

wherein

Y—(A)— is selected from the group consisting of (Abstract continued on next page.)

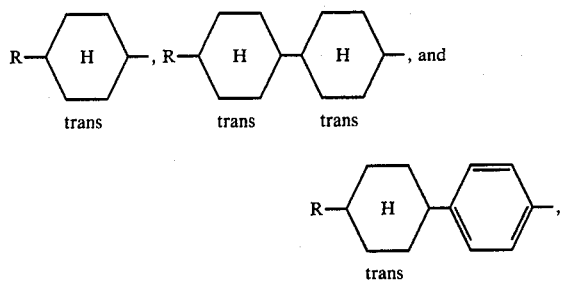

Z represents a covalent bond or a carboxyl group —C(O)O—, R is selected from the group consisting of hydrogen, $C_1$–$C_{12}$ alkyl, and $C_1$–$C_{12}$ alkoxy and $X^2$ and $X^3$ may be the same or different and are selected from the group consisting of hydrogen, halogen, and nitrile, with the proviso that at least one of the groups $X^2$ and $X^3$ is not hydrogen, are useful as components of liquid crystal mixtures for elektrooptical twist cells.

19 Claims, No Drawings

LIQUID CRYSTAL COMPOUNDS

BACKGROUND OF THE INVENTION

1. Field of the Invention

This invention relates to anisotropic compounds and more particularly to liquid crystal mixtures (LC-mixtures) which contain these compounds and are useful as dielectrics in liquid crystal apparatus.

2. Description of the Prior Art

The best known LC-compounds correspond to the following formulae (10) and (11):

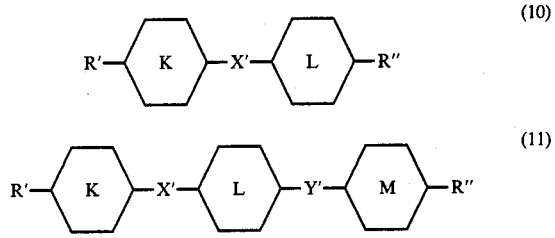

wherein the rings K, and L, are optionally M and benzene, transcyclohexane or heterocyclic rings, X' and optionally Y' are direct bonds and/or carboxy groups and/or azomethine groups, and R' and R" are alkyl, alkoxy, alkylamino, alkylcarbonyloxy or nitrile groups.

Representative publications describing the current state of the art are German Offenlegungsschriften No. 3,306,738; 2,306,739; 2,545,121; 2,636,684; and 2,701,591, as well as the corresponding disclosures in "Liquid Crystals in Tables", by D. Demus et al, Leipzig, 1974.

In the case of LC electrooptic twist cells, it is generally recognized that a nematic LC-mixture with a sufficiently high positive dielectric anisotropy is suitable for use as a dielectric. Molecules having a large dielectric anisotropy can be obtained by incorporating substituents having large dipole moments parallel to the long axis of the molecule into the compounds of formulae (10) and (11). The dielectric anisotropy is defined as the difference between the dipole moment normal to the molecular axis and that parallel thereto, that is $$\Delta\epsilon = \epsilon_{||} - \epsilon_{\perp}$$

Typically in these compounds R' is an alkyl or alkoxy group, while R" is a nitrile, alkyl, or alkoxy group.

Because of this structure and the contribution of the substituents perpendicular to the molecular axis, the $\epsilon_{\perp}$ is about 5, whereby the $\epsilon_{||}$, for example, can be about 5 or can vary between 20–30. This has been established by many authors. See, for example, L. Pohl et al, Phys. Lett. 60 A, 421 (1977); A. Boller et al, Mol. Cryst. Liq. Cryst. 42, 215 (1977); R. T. Klingbiel et al, J. Am. Soc. 96 (25), 7651 (1974).

The incorporation of a cyclohexane ring, in contrast to a benzene ring, in the structural formulae (10) and (11) has the advantage that the compounds have a lower viscosity. However, such compounds have the disadvantages that the tendency to form smectic phases is enhanced and the so-called Δn-value, which is determined analogously to Δε from the difference between the refractive indices perpendicular and parallel to axis of the molecule, is decreased.

Commercially useful LC-apparatus requires LC mixtures having specific and limited threshold voltages and specific positive Δε values, e.g., from 1 to 10 or greater. According to the present state of the art, these conditions can only be satisfied by using mixtures or components which have a large Δε value and those which have a very low Δε value, which again tends to favor the formation of smectic phases, as has been determined by several authors (G. Heppke et al, Z. Naturforsch. 33a, 185 (1978) and B. Engelen et al, Ann. Phys. (Paris) 3, 403 (1978)).

An increase of $\epsilon_{\perp}$ with constant Δε value which is required for the threshold voltage value is desirable (see, for example, A. R. Kmetz, SJD Digest, Techn. Papers IX, 70 (1978)).

This goal is unattainable with the hitherto known LC-compounds of the formulae (10) and (11), since the only known nematic LC-compounds with positive Δε values have $\epsilon_{\perp}$ values around 5. Hitherto the problem has been circumvented by mixing element LC-materials which have positive Δε values with components which have a negative Δε value. This again leads to a relatively high threshold voltage and often to the appearance of smectic phases.

Hence, a need has continued to exist for LC-compounds which combine a large Δε value with a suitable threshold voltage.

SUMMARY OF THE INVENTION

Accordingly, it is an object of this invention to provide LC-materials which do not require the use of substances having very diverse Δε values.

A further object is to provide LC-materials wherein the tendency to form smectic phases is diminished or eliminated.

Further objects of the invention will become apparent from the description of the invention which follows.

The objects of the invention are attained by providing compounds of formula (1) below wherein the value of $\epsilon_{\perp}$ can take on values greater than 5. These compounds are more adaptable to the requirements of practical operation because the Δε value can be adjusted more easily, i.e., not only by variation of $\epsilon_{||}$. The anisotropic compounds of the invention have the formula

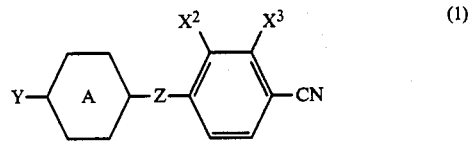

wherein

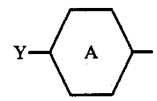

is selected from the group consisting of

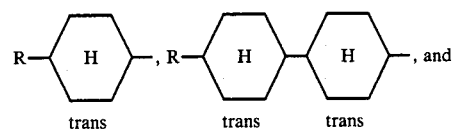

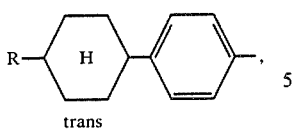

Z represents a covalent bond or a carboxyl group —C(O)O—, R is selected from the group consisting of hydrogen, $C_1$–$C_{12}$ alkyl, and $C_1$–$C_{12}$ alkoxy and $X^2$ and $X^3$ may be the same or different and are selected from the group consisting of hydrogen, halogen, and nitrile, with the proviso that at least one of the groups $X^2$ and $X^3$ is not hydrogen.

DESCRIPTION OF THE PREFERRED EMBODIMENTS

According to the preferred embodiments of the invention, the groups $X^2$ and $X^3$ in formula (1) are not hydrogen and preferably are nitrile groups. Other preferred embodiments are those compounds wherein X is a carboxyl group —C(O)O—.

The term "anisotropic" signifies that a particular compound is either enantiotropically liquid crystalline or potentially liquid crystalline. A compound is potentially liquid crystalline if either (a) its molten form can be supercooled and in the supercooled state exhibits liquid crystalline properties, (monotropically liquid crystalline), or (b) when $T_c$ (clearing temperature) is determined, a mixture of the potentially liquid crystalline compound and an enantiotropically liquid crystalline compound exhibits a mesophase, e.g., one which is detectable by extrapolation.

Another preferred group of compounds according to the invention falling within the scope of formula (1) are the compounds of the following formula (2):

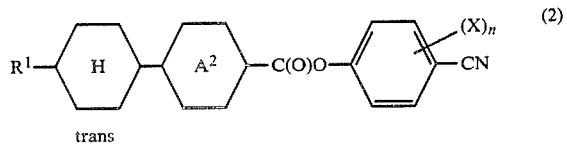

in which $R^1$ is $C_1$–$C_{12}$ alkyl or $C_1$–$C_{12}$ alkoxy, ring $A^2$ is selected from the group consisting of

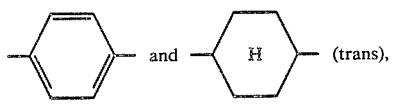

X is halogen or cyano, and n is an integer of 1 or 2.

Another preferred embodiment of the invention falling within the scope of formula (1) are the compounds represented by the following structural formula (4):

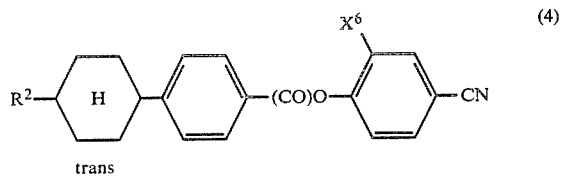

wherein $X^6$ is halogen or cyano and $R^2$ is an alkyl group having 1–12 carbon atoms.

Also preferred are compounds of formula (1) defined by the following formula (5):

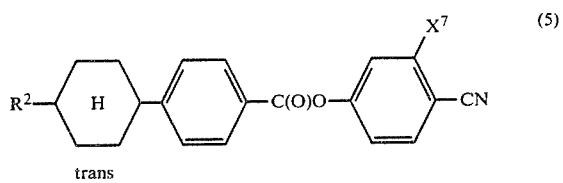

wherein $X^7$ is halogen or cyano and $R^2$ is an alkyl group having 1–12 carbon atoms.

Also preferred are compounds of formula (1) defined by the following formula (6):

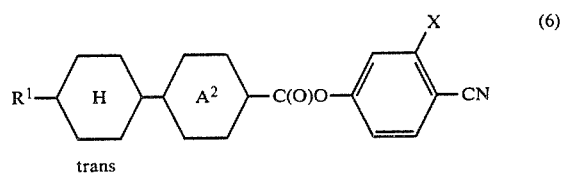

wherein $R^1$ is $C_{1-12}$ alkyl and ring $A^2$ is 1,4-phenylene or trans-1,4-cyclohexylene and X is halogen or cyano.

Also preferred are compounds of the formula (1) defined by the following formula (7):

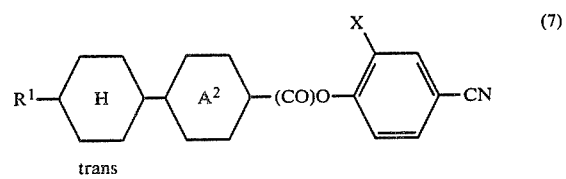

wherein $R^1$ is $C_{1-12}$ alkyl and ring $A^2$ is 1,4-phenylene or trans-1,4-cyclohexylene and X is halogen or cyano.

Finally, another preferred group of compounds of formula (1) are those represented by the following structural formulae (8) and (9):

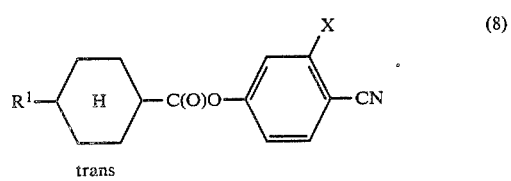

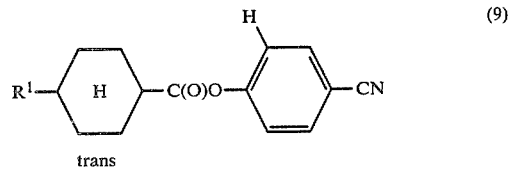

wherein $R^1$ is $C_{1-12}$ alkyl and X is halogen or cyano.

The preferred compounds of the formulas (4), (5), (6), (7), (8), and (9) are those wherein the alkyl group is a straight chain n-alkyl group and has a moderate chain length, e.g., typically 3 to 7 carbon atoms, and the n-pentyl group is a typical example of such groups.

The compounds of formula (2) can be obtained according to the following reaction sequence:

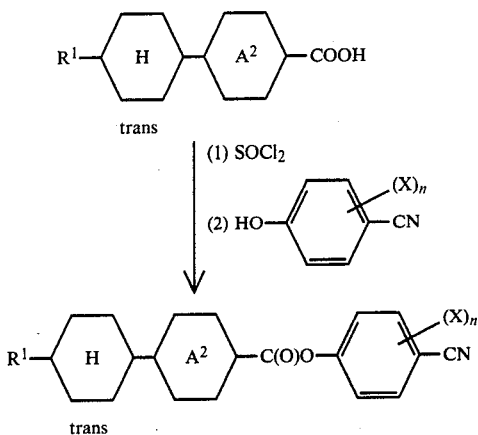

wherein the symbols are as defined in formula (2) above.

The compounds of formula (1) wherein Z is a direct bond (single bond) can be obtained by procedures analogous to those described in German Offenlegungsschrift No. 2,636,684 and German Offenlegungsschrift No. 2,701,591, by using correspondingly modified compounds for the rings substituted by $X^2$ and $X^3$.

The compounds of formula (1) wherein Z is a covalent bond can be prepared in the usual way by halogenation, e.g., bromination, of the corresponding hydrocarbon (see, e.g., G. Sundstrom et al, "The Science of Total Environment", Vol. 6 (1976), pages 15–29) and by reacting the so obtained halogen (bromine) derivative with CuCN in n-methylpyrrollidone by known procedures (see G. W. Gray et al, J. Chem. Soc., Perkin Transactions, vol. 2 (1976), p. 97). These can be converted into the corresponding nitrile derivatives.

In the following Table I, examples of compounds of the invention of formula (2) are given together with their properties. The preparation of these compounds will be described below.

TABLE I

| No. | $R^{1*}$ | $A^2$ | $(CN)_n$ | $T_m$ (°C.) | $T_c$ (°C.) | $\epsilon_\parallel$ | $\epsilon_\perp$ |
|---|---|---|---|---|---|---|---|
| 1 | n-C$_5$H$_{11}$ | Phenyl | 2-CN, | 132.2 | 178.7 | 11.0 | 7.8 |
| 2 | n-C$_5$H$_{11}$ | Phenyl | 3-CN, | 85.2 | 143.9 | 28.2 | 7.5 |
| 3 | n-C$_5$H$_{11}$ | Cyclohexyl | 3-CN, | 96.8 | 165.5 | 16.4 | 5.5 |

*The particular alkyl group $R^1$ may be varied between $C_1$ and $C_{12}$ or may be replaced by hydrogen, without significantly altering the properties of the compounds. Therefore, compounds Nos. 1-3 represent preferred types of compounds according to the invention, which are by no means limited to particular $R^1$ groups.

Having generally described the invention, a more complete understanding can be obtained by reference to certain specific examples, which are provided herein for purposes of illustration only and are not intended to be limiting unless otherwise specified. These examples illustrate the preparation of compounds of this invention using known procedures.

EXAMPLE 1 p--(4-trans-n-Pentylcyclohexyl)benzoic acid (10 g, 26.5 mM) was refluxed with thionyl chloride (50 ml) for one hour. The resulting acid chloride was separated from the excess thionyl chloride. The acid chloride was added dropwie to a solution of 5.3 g (36.5 mM) of 2,4-dicyanophenol (M.P. 230° C., dec.) in 100 ml of pyridine. After the reaction was complete, the mixture was poured into excess dilute hydrochloric acid and extracted with methylene chloride.

The product was isolated from the organic phase by evaporation of the solvent. The crude product was purified by vacuum distillation (250° C./0.02 Torr) and finally recrystallized from benzene/hexane, M.P. 132.2° C., $T_c$ 178.7° C. (clearing temperature).

The compound obtained is compound No. 1 of Table 1 above; it is a nematic liquid crystalline compound.

EXAMPLE 2 p-(4-trans-n-Pentylcyclohexyl)benzoic acid (10 g, 36.5 mM) was refluxed with thionyl chloride (50 ml) for one hour. The excess thionyl chloride was removed by distillation. The resulting acid chloride was added dropwise to a solution of 5.3 g (36.5 ml) of 3,4-dicyanophenol (M.P. 158° C.) in 100 ml of pyridine. The reaction mixture was stirred overnight and then poured into dilute hydrochloric acid. The product was extracted with methylene chloride, then purified by recrystallization from hexane (M.P. 85.2° C.; $T_c$ 143.9° C.). The compound so obtained is compound No. 2 of Table I. It exhibits an enantiotropic nematic phase.

EXAMPLE 3

4-trans-(4'-trans-n-Pentylcyclohexyl)cyclohexanecarboxylic acid (7 g, 25 mM) was heated with thionyl chloride (40 ml) for 30 min at reflux temperature. The resulting acid chloride was separated from the excess thionyl chloride. The acid chloride so obtained was then added dropwise to a solution of 3,4-dicyanophenol (3.5 g, 5 ml) in 100 ml of pyridine at 0° C. After the reaction was complete the reaction mixture was worked up as described in Example 2. The product was recrystallized from hexane (M.P. 96.8° C., $T_c$ 165.5° C.) and is Compound No. 3 of Table I; the compound is a nematic enantiotropic compound.

EXAMPLES 4–6

By the procedure of Example 1, the homologs of Compound No. 1 of Table I wherein $R^1$=H, CH$_3$, and n-C$_{12}$H$_{25}$ were prepared.

EXAMPLES 7–10

By the procedures of Example 2, the homologs of the Compound No. 2 of Table I wherein $R^1$=H, CH$_3$, and n-C$_{12}$H$_{25}$ were prepared.

EXAMPLES 11–13

By the procedures of Example 3, the homologs of Compound No. 3 of Table I wherein $R^1$=H, CH$_3$, and n-C$_{12}$H$_{25}$ were prepared.

All compounds of the invention prepared by Examples 1–13 are anisotropic (liquid crystalline or potentially liquid crystalline) in the sense of the definition given above. The values of $\epsilon_\parallel$ and $\epsilon_\perp$ of the compounds of the invention of Examples 4–13 were similar to those of the structurally corresponding compounds of Examples 1–3 respectively. The absolute value of the polarizabilities varied insignificantly with the length of the alkyl chain (i.e., the absolute value was somewhat higher with increasing length of the alkyl chain). The ratio $\epsilon_\parallel/\epsilon_\perp$, however, is practically constant for each of the structures corresponding to Compounds 1–3 respectively of Table I with different R-groups.

EXAMPLE 14

Compound No. 1 of Table I was prepared by the following method:

To 350 cm³ of toluene was added 10 g (36.5 mM) of p-(4-trans-n-pentylcyclohexyl)benzoic acid, 5.3 g (36.5 mM) of 2,4-dicyanophenol, 0.25 g of concentrated sulfuric acid, and 0.15 g of boric acid. The solution was held at reflux temperature for 120 hours whereby the water formed in the reaction was removed. Then the toluene was distilled off. A crude product was obtained which was purified by chromatography on a silica column. In this way, 10 g of pure material was obtained, i.e., a yield of about 67%.

By this procedure, the homologs corresponding to Compound No. 1 ($R^1$=H or $C_1$-$C_{12}$-alkyl) can be prepared, using the corresponding benzoic acid derivatives.

Improved LC-mixtures for the known electrooptical twist cells can be prepared using the compounds of the invention. Preferably, such LC-mixtures contain up to about 25% by weight of a compound of formula (1), preferably 1-20 percent by weight. The LC-mixtures can advantageously contain several compounds of formula (1), e.g., up to a total proportion of about half of the mixture by weight.

Having now fully described the invention, it will be apparent to one of ordinary skill in the art that many changes and modifications can be made thereto without departing from the spirit or scope of the invention as set forth herein.

What is claimed and intended to be secured by Letters Patent of the United States is:

1. Anisotropic compounds of the formula

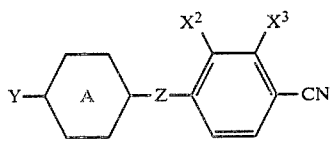

wherein

is selected from the group consisting of

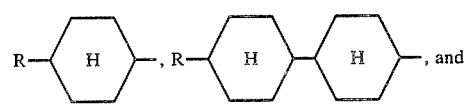

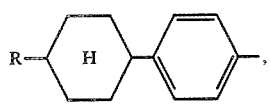

Z represents a carboxyl group, R is selected from the group consisting of hydrogen and $C_1$-$C_{12}$ alkyl, and one of $X^2$ and $X^3$ is selected from the group consisting of halogen, and nitrile, and the other radical $X^2$ or $X^3$ is hydrogen.

2. Anisotropic compounds according to claim 1 wherein at least one of said groups $X^2$ and $X^3$ is halogen.

3. Anisotropic compounds according to claim 1 wherein at least one of said groups $X^2$ and $X^3$ is cyano.

4. Anisotropic compounds according to claim 1 having the formula (2)

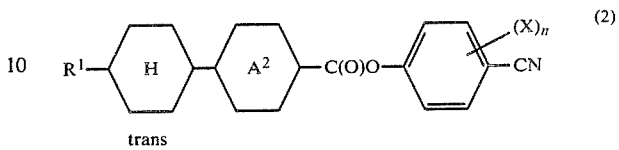

in which $R^1$ is $C_1$-$C_{12}$ alkyl, ring $A^2$ is selected from the group consisting of

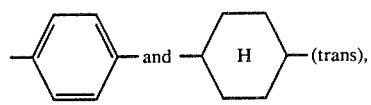

X is halogen or cyano, and n is an integer of 1.

5. Anisotropic compounds according to claim 4 wherein ring $A^2$ is

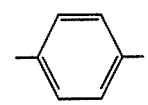

6. Anisotropic compounds according to claim 4 wherein ring $A^2$ is

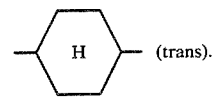

7. Anisotropic compounds according to claim 5 of the formula (4)

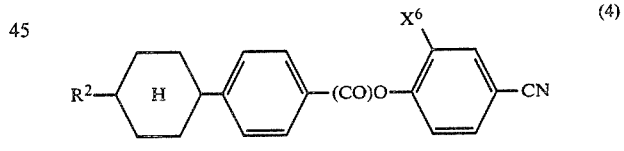

wherein $X^6$ is halogen or cyano and $R^2$ is an alkyl group having 1-12 carbon atoms.

8. Anisotropic compounds according to claim 7 wherein $X^6$ is cyano and $R^2$ is n-pentyl.

9. Anisotropic compounds according to claim 7 wherein $X^6$ is halogen and $R^2$ is n-pentyl.

10. Anisotropic compounds according to claim 5 of the formula (5)

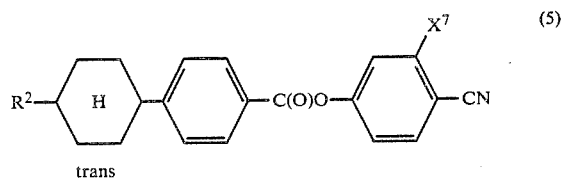

wherein $X^7$ is halogen or cyano and $R^2$ is an alkyl group having 1-12 carbon atoms.

11. Anisotropic compounds according to claim 10, wherein $X^7$ is halogen and $R^2$ is n-pentyl.

12. Anisotropic compounds according to claim 10 wherein $X^7$ is cyano and $R^2$ is n-pentyl.

13. Anisotropic compounds according to claim 4 of the formula (6)

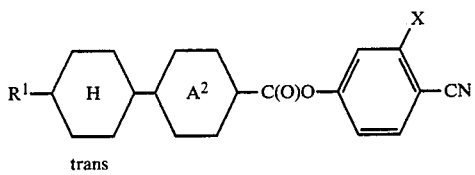

wherein $R^1$ is $C_{1-12}$ alkyl and ring $A^2$ and X are as defined in claim 6.

14. Anisotropic compounds according to claim 4 of the formula (7)

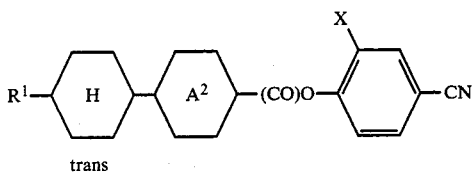

wherein $R^1$ is $C_{1-12}$ alkyl and ring $A^2$ and X are as defined in claim 6.

15. Anisotropic compounds according to claim 1 of for formula (8)

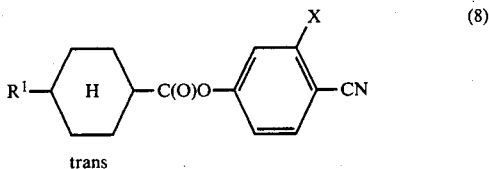

wherein $R^1$ is $C_{1-12}$ alkyl and X is halogen or cyano.

16. Aniotropic compounds according to claim 1 of the formula (9)

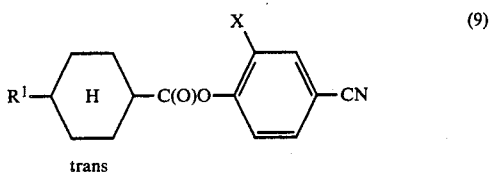

wherein $R^1$ is $C_{1-12}$ alkyl and X is halogen or cyano.

17. A liquid crystalline mixture comprising at least two components at least one of which is a compound of claim 1.

18. A liquid crystalline mixture of claim 17, wherein at least one of said compounds constitutes 10-20 percent by weight of the mixture.

19. A liquid crystalline mixture of claim 18, wherein more than one of said compounds is present and the total amount of said compounds constitutes up to 50% by weight of the mixture.

* * * * *